I. M. JACOBS & W. CRAMER.
SUPPORT FOR BRAKE RIGGING IN MOTOR VEHICLES.
APPLICATION FILED OCT. 26, 1917.
1,275,932.
Patented Aug. 13, 1918.
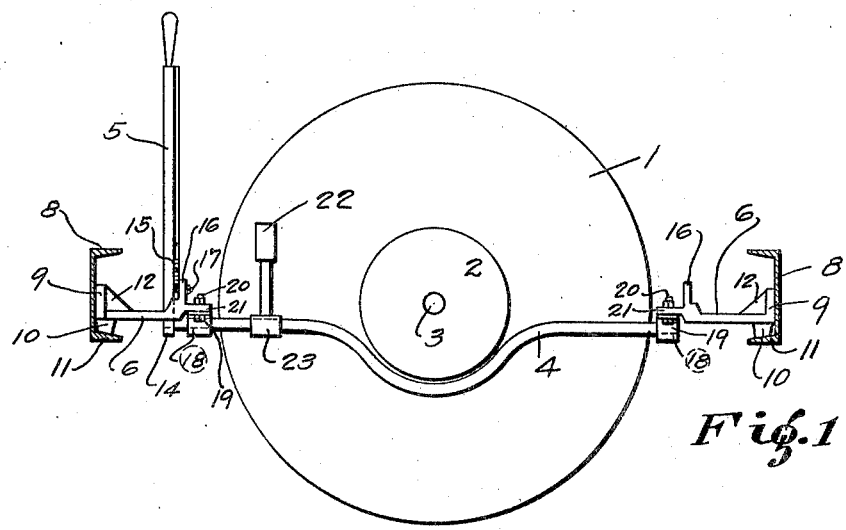
Fig. 1
Fig. 2
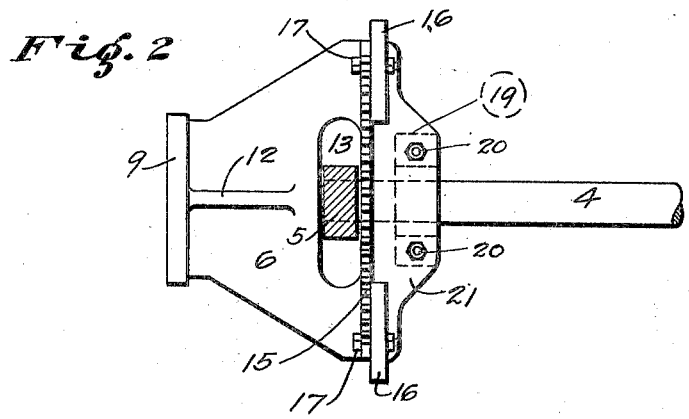
Fig. 3
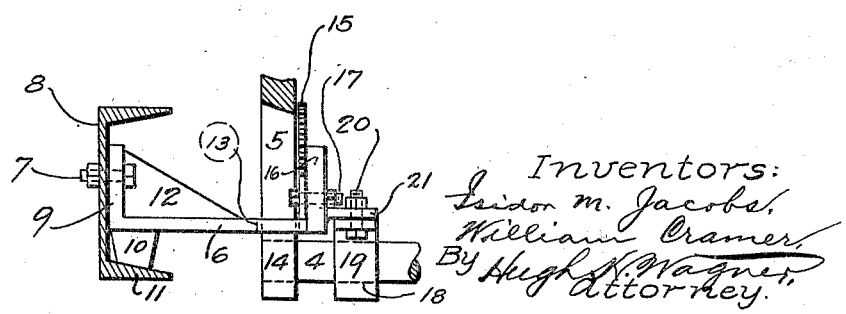
Inventors:
Isidor M. Jacobs,
William Cramer,
By Hugh N. Wagner
Attorney.

UNITED STATES PATENT OFFICE.

ISIDOR M. JACOBS, OF KANSAS CITY, AND WILLIAM CRAMER, OF ST. LOUIS, MISSOURI, ASSIGNORS, BY MESNE ASSIGNMENTS, TO TRUCK, TRACTOR, AND MANUFACTURING COMPANY, OF ST. LOUIS, MISSOURI, A CORPORATION OF MISSOURI.

SUPPORT FOR BRAKE-RIGGING IN MOTOR-VEHICLES.

1,275,932. Specification of Letters Patent. Patented Aug. 13, 1918.

Application filed October 26, 1917. Serial No. 198,647.

*To all whom it may concern:*

Be it known that we, ISIDOR M. JACOBS and WILLIAM CRAMER, citizens of the United States, residing at Kansas City, in the county of Jackson and State of Missouri, and St. Louis, State of Missouri, respectively, have invented certain new and useful Improvements in Supports for Brake-Rigging in Motor-Vehicles, of which the following is a specification.

This invention, while it may be of general utility, is especially designed in aid of the salvaged constructions contemplated by the application for patent Serial No. 163,652, filed April 21, 1917, by one of the joint inventors herein named, and has for its object the ready utilization of salvaged motor vehicle parts and provides a support for a brake lever to be used in connection with the adjustable brake rigging that forms the subject-matter of another application for patent executed by these inventors simultaneously herewith, and also a support for the control shaft of a certain type of machines.

In the accompanying drawings forming part of this specification, in which like numbers of reference denote like parts wherever they occur, Figure 1 is a front elevation, showing the chassis in section;

Fig. 2 is a top plan view; and

Fig. 3 is a view of the left hand end portion of Fig. 1 on an enlarged scale, with certain parts broken away.

The location of the transmission hood 1 having the plate 2 with an opening therethrough for shaft 3 determines the location of the control shaft 4, as does also the fact that the brake lever 5 must be located adjacent to the driver's seat (not shown in the drawings).

This invention consists primarily in the bracket 6 that is attached by bolt 7 to the web 8 of the channel beam forming the side of the chassis.

The bracket 6 is formed with a horizontal part and a vertical member 9 through which the said bolt 7 passes, and with a depending lug 10 that is preferably shaped to fit the slanting inside edge of the flange 11 of the said channel member. The web 12 extends between the horizontal part of the bracket 6 and the vertical part 9 to strengthen the same.

The brake lever 5 passes through slot 13 in the bracket 6, and is fixed at 14 to control shaft 4. The rack 15 provides the usual means for holding the brake set.

At the end of the bracket 6 away from the vertical part 9 is a pair of vertical parts or arms 16, to which the said rack 15 is attached by bolts 17, the said arms 16 as well as part 9 being integral with the bracket 6.

The collar or strap 18 provides a bearing 19 for control shaft 4, which member 18 is attached by bolts 20 to the horizontal projection 21 from bracket 6. Thus an old and used control shaft 4 is provided with the bearings afforded by a bracket 6 attached to each side of the chassis, as shown in Fig. 1, which chassis, as explained in the said application 163,652, will usually be wider than the engine salvaged for such a construction as herein contemplated.

The said brackets will be manufactured of standard forms and sizes for the said purpose and will be adapted for use on either the right or left hand side of the vehicle. When used on the side next to the brake handle 5, arms 16 will be used for the attachment of the rack 15 while the bracket on the opposite side will be used for all the purposes herein stated except for the attachment of the said rack 15.

Having thus described this invention, we hereby reserve the benefit of all changes in form, arrangement, order, or use of parts, as it is evident that many minor changes may be made therein without departing from the spirit of this invention, or the scope of the following claims.

We claim—

1. In a device of the character described, the combination of a channel member having a flange, a bracket having a lug adapted to be supported by the said flange, a vertical part of the said bracket adapted for attachment to the said channel member, means for such attachment, a bearing borne by the said bracket, a control shaft, and a brake lever passing through the said bracket and fixed to the said control shaft.

2. In a device of the character described, the combination of a channel member having a flange, a bracket having a lug adapted to be supported by the said flange, a vertical part of the said bracket adapted for attachment to the said channel member, means for such attachment, a bearing borne by the said bracket, a control shaft, a brake lever passing through the said bracket and fixed to the said control shaft, and arms extending from the said bracket and a brake-setting rack attached thereto.

3. In a device of the character described, the combination of a pair of spaced-apart channel members each having a flange, a pair of brackets each having a lug adapted to be supported by said flanges, a vertical part of the said brackets adapted for attachment to the said channel members, means for such attachment, a control shaft, and a bearing borne by each of said brackets adapted to support opposite ends of said control shaft.

4. In a device of the character described, the combination of a pair of spaced-apart channel members each having a lower flange, a pair of brackets attached thereto and extending toward each other, a control shaft, a bearing borne by each of said brackets adapted to support opposite ends of the control shaft, and each of said brackets having a lug adapted to be supported by the lower flange of its respective channel member.

In testimony whereof we hereunto affix our signatures.

ISIDOR M. JACOBS.
WILLIAM CRAMER.

Copies of this patent may be obtained for five cents each, by addressing the "Commissioner of Patents, Washington, D. C."